US 8,175,884 B1
May 8, 2012

(12) United States Patent
Morris

(54) ENVIRONMENTAL CONDITION DETECTOR WITH VALIDATED PERSONALIZED VERBAL MESSAGES

(76) Inventor: Gary Jay Morris, Morgantown, WV (US)

( * ) Notice: Subject to any disclaimer, the term of this patent is extended or adjusted under 35 U.S.C. 154(b) by 0 days.

(21) Appl. No.: 13/354,888

(22) Filed: Jan. 20, 2012

Related U.S. Application Data

(60) Provisional application No. 61/440,433, filed on Feb. 8, 2011, provisional application No. 61/537,035, filed on Sep. 20, 2011.

(51) Int. Cl.
*G10L 11/00* (2006.01)
*G10L 21/00* (2006.01)
*G08B 21/00* (2006.01)

(52) U.S. Cl. ........ 704/270; 704/275; 340/540; 340/521; 340/628

(58) Field of Classification Search .......... 704/270, 704/275; 340/540, 521, 628
See application file for complete search history.

(56) References Cited

U.S. PATENT DOCUMENTS

| | | |
|---|---|---|
| 3,855,574 A | 12/1974 | Welty |
| 3,906,491 A | 9/1975 | Gosswiller et al. |
| 4,275,274 A | 6/1981 | English |
| 4,288,789 A | 9/1981 | Molinick et al. |
| 4,335,379 A | 6/1982 | Martin |
| 4,363,031 A | 12/1982 | Reinowitz |
| 4,453,222 A | 6/1984 | Goszyk |
| 4,455,551 A | 6/1984 | Lemelson |
| 4,498,078 A | 2/1985 | Yoshimura et al. |
| 4,519,027 A | 5/1985 | Vogelsburg |
| 4,531,114 A | 7/1985 | Topol et al. |
| 4,682,348 A | 7/1987 | Dawson et al. |
| 4,754,266 A | 6/1988 | Shand et al. |
| 4,816,809 A | 3/1989 | Kim |
| 4,821,027 A | 4/1989 | Mallory et al. |
| 4,851,823 A | 7/1989 | Mori |
| 4,876,676 A | 10/1989 | Shimizu et al. |
| 4,912,457 A | 3/1990 | Ladd |
| 4,951,045 A | 8/1990 | Knapp et al. |
| 5,291,183 A | 3/1994 | Chiang |
| 5,349,338 A | 9/1994 | Routman et al. |
| 5,663,714 A | 9/1997 | Fray |
| 5,706,399 A * | 1/1998 | Bareis .......................... 704/274 |
| 5,724,020 A | 3/1998 | Hsu et al. |

(Continued)

OTHER PUBLICATIONS

Bruck et al, "The Effectiveness of Different Alarms in Waking Sleeping Children", Sep. 2004, Proceedings of 3rd International Symposium on Human Behaviour in Fire, Belfast, Northern Ireland, London: Interscience Communications, pp. 279-290.

*Primary Examiner* — Jialong He
(74) *Attorney, Agent, or Firm* — Gary J. Morris

(57) ABSTRACT

An environmental condition detector emits only safe, validated verbal messages recorded in a user's voice to help occupants of a building respond safely to sensed environmental conditions. The message emitted in the user's voice is generally a familiar voice to other building occupants to better capture their attention, and only certain, safe, user messages are validated for use thereby eliminating the chance that the user may unknowingly record an unsafe message to be emitted during a sensed environmental condition. The verbal message is recorded by a user and is analyzed through speech recognition to determine if the user-recorded message can be validated as containing safe content. A user-recorded message found to match manufacturer preprogrammed message content is validated and selected to be audibly emitted in the user's voice when an environmental condition is sensed. Various embodiments include single station units, interconnected units, or centrally controlled security systems.

24 Claims, 7 Drawing Sheets

U.S. PATENT DOCUMENTS

| | | |
|---|---|---|
| 5,726,629 A | 3/1998 | Yu |
| 5,786,768 A | 7/1998 | Chan et al. |
| 5,808,541 A | 9/1998 | Golden |
| 5,936,515 A | 8/1999 | Right et al. |
| 5,991,726 A | 11/1999 | Immarco et al. |
| 6,043,750 A | 3/2000 | Mallory |
| 6,091,328 A | 7/2000 | Ichikawa et al. |
| 6,097,289 A | 8/2000 | Li et al. |
| 6,114,967 A | 9/2000 | Yousif |
| 6,133,839 A | 10/2000 | Ellul et al. |
| 6,144,310 A | 11/2000 | Morris |
| 6,263,311 B1 * | 7/2001 | Dildy .................. 704/273 |
| 6,266,995 B1 | 7/2001 | Scott |
| 6,323,780 B1 | 11/2001 | Morris |
| 6,326,880 B1 | 12/2001 | Tice |
| 6,344,799 B1 | 2/2002 | Walker |
| 6,346,880 B1 | 2/2002 | Schroeder et al. |
| 6,351,212 B1 | 2/2002 | Lynch |
| 6,380,854 B1 | 4/2002 | Hagerman et al. |
| 6,411,207 B2 | 6/2002 | Shaffer |
| 6,426,703 B1 | 7/2002 | Johnston et al. |
| 6,496,111 B1 | 12/2002 | Hosack |
| 6,522,248 B1 | 2/2003 | Andres et al. |
| 6,552,647 B1 | 4/2003 | Thiessen et al. |
| 6,584,439 B1 | 6/2003 | Geilhufe et al. |
| 6,624,750 B1 | 9/2003 | Marman et al. |
| 6,707,383 B2 | 3/2004 | Flaherty |
| 6,768,424 B1 | 7/2004 | Morris |
| 6,859,145 B2 | 2/2005 | Wilker et al. |
| 6,970,077 B2 | 11/2005 | Johnson et al. |
| 6,980,106 B2 | 12/2005 | Sutphin |
| 6,999,923 B1 | 2/2006 | Ablondi et al. |
| 7,005,999 B2 | 2/2006 | Salzhauer et al. |
| 7,068,176 B2 | 6/2006 | Black et al. |
| 7,109,879 B2 | 9/2006 | Stults et al. |
| 7,386,448 B1 * | 6/2008 | Poss et al. .................. 704/247 |
| 7,605,687 B2 | 10/2009 | Morris |
| 7,719,407 B2 | 5/2010 | Pearson et al. |
| 7,752,047 B2 | 7/2010 | Morris |
| 7,839,265 B2 | 11/2010 | Picard et al. |
| 8,013,730 B2 | 9/2011 | Oh et al. |
| 8,077,028 B2 | 12/2011 | Lane et al. |
| 2002/0107694 A1 | 8/2002 | Lerg |
| 2003/0229500 A1 * | 12/2003 | Morris ................... 704/275 |
| 2006/0214809 A1 | 9/2006 | Sistare |
| 2008/0046250 A1 * | 2/2008 | Agapi et al. ............ 704/275 |
| 2008/0111700 A1 * | 5/2008 | Smudde .................. 340/628 |
| 2009/0025071 A1 * | 1/2009 | Mumm et al. ................. 726/7 |
| 2009/0216533 A1 * | 8/2009 | Leite et al. ............. 704/251 |

* cited by examiner

ENVIRONMENTAL CONDITION DETECTOR WITH VALIDATED PERSONALIZED VERBAL MESSAGES

CROSS REFERENCES TO RELATED PATENT APPLICATIONS

This application claims the benefit of provisional application No. 61/440,433 filed Feb. 8, 2011 and provisional application No. 61/537,035 filed Sep. 20, 2011, both of which are hereby incorporated by reference herein in their entireties.

FIELD OF INVENTION

This invention relates to an environmental condition detector using a familiar user's recorded verbal message to notify an occupant of a dwelling or building of the presence of a potentially hazardous environmental condition and to provide instructions on how to safely respond to the condition. The familiar user's recorded verbal message is validated for use by matching the familiar user's recorded message, through speech recognition, to at least one manufacturer pre-programmed message stored in the electronic memory of the detector, thereby allowing only certain, safe and validated message content to be emitted in the familiar user's voice when an environmental condition is detected.

BACKGROUND OF THE INVENTION

Research has indicated that certain segments of the population (for example, young children and the elderly) may be more easily awakened from sleep through the use of a human voice annunciation in addition to or in place of a tonal pattern emitted from a life safety device including but not limited environmental condition detectors. Further, it has been shown that the use of a voice familiar to the sleeping person may even be more effective in awakening a person and alerting him or her to the presence of a potential hazard. Therefore, the use of life safety devices such as environmental condition detectors which emit a message using a familiar voice can be useful to help notify persons of the existence of potentially hazardous conditions in their environment. One way to accomplish this is to have a user familiar to other occupants of a dwelling or building equipped with an environmental condition detector unit record a verbal message of their own original content into an electronic memory of the detector unit to be played audibly upon the sensing of an environmental condition. One potential problem with this scenario is that the user recording the message may not record a message that is most helpful or safe to other occupants of the dwelling or building. In a worst case scenario, a user recording his or her own messages could further endanger the other building occupants by unknowingly providing dangerous instructions on how to respond to a sensed environmental condition. Since the specific factors surrounding each hazardous condition occurring in a dwelling or building are different, what may seem like reasonable directions to a particular person on how to respond to one hazardous situation may prove disastrous in another situation. For example, a person may choose to record instructions to open a window in response to the presence carbon monoxide to provide fresh air; however, if the same instructions were recorded as a response to the presence of fire, life threatening conditions could occur in certain situations. As another example, an ill-advised user could choose to record his or her own alarm tonal patterns or other sounds that could confuse other occupants of the dwelling or building who are accustomed to the tonal patterns which have specific meaning with respect to the type of condition that was detected. As another example, a well meaning parent could record a message for a child to wait in the child's bedroom until a parent comes to get them. When an unpredictable, hazardous condition occurs, the parent may not be home or may be unable to get to the child's bedroom causing increased risk to the child if the parent never arrives. In general, the common users of life safety devices, while they may have the best of intentions, quite often lack the requisite knowledge to give consistently appropriate instructions to others on how to remain safe in a potentially hazardous situation. This is particularly the case when a user records a message of their own content without any knowledge of the details of what a future hazardous situation may involve.

The various embodiments of the instant invention provide the desired alerting feature of a familiar voice during the detection of an environmental condition to effectively capture the attention or awaken other occupants of a dwelling or building while also providing the critical additional safety feature of not permitting unsafe instructions to be audibly broadcast to the occupants trying to deal with a potentially hazardous condition. Research has shown that young children are a significant part of the population who may benefit most by hearing a familiar voice during an emergency situation, especially while they are sleeping. Therefore, it is particularly important to limit messages in a familiar voice emitted during potentially hazardous situations to only messages with safe content since young children, in particular, will not likely have the ability to clearly decide how to safely respond themselves to a potentially life-threatening situation.

SUMMARY OF THE INVENTION

The present invention solves the potentially serious problem described above by permitting a user to record verbal messages and instructions in his or her own voice but only to the extent that the content of the messages match pre-set messages that are pre-programmed into the detector unit from the manufacturer. Therefore, the content of the user-recorded verbal messages that can be emitted in the user's voice during the sensing of an environmental condition is limited to only safe messages as determined by the manufacturer which is message validation. During set-up of the environmental condition detector unit, the user refers to a menu (printed menu or audible menu emitted from the detector in one embodiment) of acceptable messages that can be possibly validated using speech recognition. As the user speaks the desired message into an audio input transducer connected to the electronic circuitry of the detector unit, the message is electronically stored (recorded) and speech recognition (and message matching) circuitry attempts to recognize and electronically match the user recorded message to one of the manufacturer pre-programmed messages in the electronic memory of the unit. If the speech recognition and message matching circuitry recognizes the message entered in the user's voice as being a match to a manufacturer pre-programmed message, then the user's recorded message is validated and is electronically identified in the electronic memory to be audibly emitted in the user's voice when the environmental condition detector senses a potentially hazardous condition. If the user's recited verbal message during the set-up mode is not recognized as a match to a manufacturer pre-programmed message, then the user's message is rejected (not validated), cleared from the electronic memory, and not identified to be audibly emitted when the environmental condition detector senses a potentially hazardous condition. The detector unit will provide audible and/or visual feedback to notify the user if the verbal message the user attempted to enter in his or her voice was validated (accepted) or not (rejected). In one, embodiment, if no user recited, verbal message can be validated, then a user may select a verbal message from a menu of manufacturer, pre-programmed verbal messages to be audibly emitted in the manufacturer's pre-programmed voice when the environmental condition detector senses a potentially hazardous condition. In another embodiment, if no user recited, verbal message can be validated after a pre-set number of attempts (3, 4, or 5 attempts as non-limiting examples), then a default, manufacturer pre-programmed verbal message will be audibly emitted though an audio output transducer (speaker) in the manufacturer's pre-programmed voice when the environmental condition detector senses a potentially hazardous condition. In one embodiment, the speech recognition and message matching circuitry only receives verbal messages from the audio input transducer during the set-up mode and is inactive otherwise. In another embodiment, the speech recognition and message matching circuitry may receive verbal messages from the audio input transducer at any time electrical power is supplied to the detector unit for receiving user spoken commands to remotely control the function and testing of the detector unit.

Any verbal message emitted from the detector unit, not in a set-up mode, is generally emitted during a silent period(s) within any tonal pattern that may be emitted from an environmental condition detector when an environmental condition is sensed. In one embodiment, the verbal message emitted from the detector unit is interleaved within the tonal pattern and is emitted in more than one silent period of the tonal pattern. In another embodiment, the verbal message emitted from the detector unit is emitted partially in one silent period of a tonal pattern and partially in at least another silent period of the tonal pattern.

In general, there can be more than one message audibly emitted for any one or more types of environmental condition sensed. In one embodiment, the user may record a person's name which is not stored in the pre-programmed memory of the unit from the manufacturer to be most effective in awakening or gaining attention of a particular person.

The user-recorded messages that may be validated by speech recognition circuitry to be audibly emitted in the user's voice from a detector unit during the sensing of an environmental condition are limited to those messages that match the content of the manufacturer pre-programmed verbal messages in electronic memory of the unit. A few illustrative examples of manufacturer pre-programmed verbal messages include, without limitation:

"Caution, carbon monoxide. Evacuate."
"Caution, carbon monoxide. Evacuate immediately and seek fresh air."
"Caution, gas detected. Evacuate. Do not turn on any lights."
"Caution, Smoke detected."
"Caution, Smoke detected. Exit safely to meeting location."
"Caution, Smoke detected. Do not open door if hot to touch"
"Caution, Smoke detected. Evacuate but do not use elevator."
"Caution, Smoke detected. Evacuate staying close to floor."
"Caution, Intruder on the premises."

A few illustrative examples of manufacturer pre-programmed verbal messages along with persons' names which are not stored in the pre-programmed memory of the unit from the manufacturer (example names shown in all capital letters below) may include, without limitation:

"JOHN, wake up. There is a fire in the house."
"MARY, wake up. Carbon monoxide is in the house, go outside now."
"JOHN, wake up. There is a fire in the house."
"MARY, wake up. Gas is leaking. Leave immediately. Do not turn on any lights."
"Wake up. There is a fire in the house, JOHN."
"Wake up, JOHN. There is a fire in the house."

DETAILED DESCRIPTION

Figure 1:
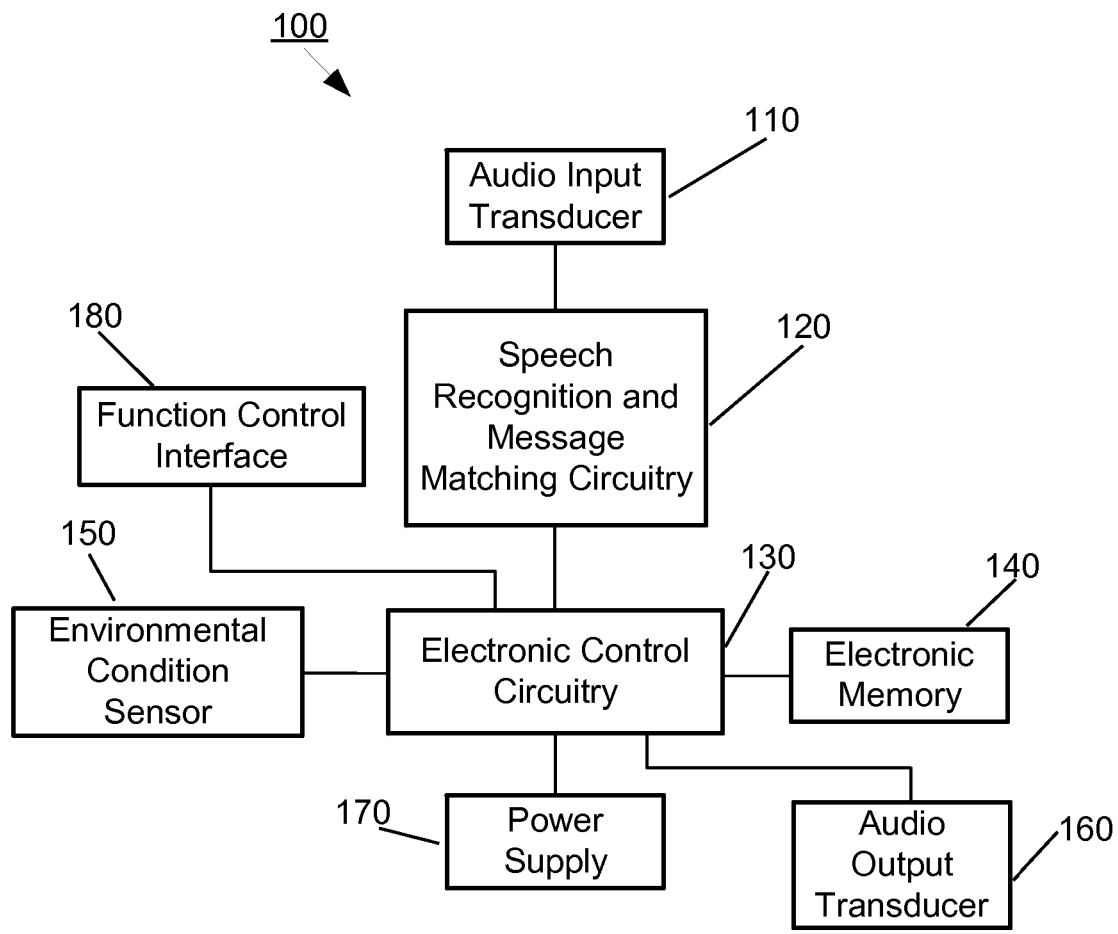
FIG. 1 is a schematic diagram of the components of the environmental condition detector with validated personalized verbal messages.

While embodiments of this invention can take many different forms, specific embodiments thereof are shown in the drawings and will be described herein in detail with the understanding that the present disclosure is to be considered as an exemplification of the principles of the invention and is not intended to limit the invention to the illustrated specific embodiments.

An exemplary environmental condition detector with validated personalized verbal messages 100 is illustrated in FIG. 1. The electronic control circuitry 130 is electronically connected to the speech recognition and message matching circuitry 120, the electronic memory 140, the audio output transducer 160, the environmental condition sensor 150, the function control interface 180 and the power supply 170. During a period when the environmental condition sensor 150 senses an environmental condition, the electronic control circuitry 130 emits an audible alarm via the audio output transducer 160 to notify persons in the vicinity of the environmental condition detector that a potentially hazardous condition is being sensed. The audible alarm comprises a personalized verbal message selected by the user in the user's voice. The audible alarm may also comprise a tonal pattern with the verbal message interleaved within silent periods of the tonal pattern. The audio input transducer 110, electronically connected to the speech recognition and message matching circuitry 120, is used to receive verbal input from the user (user-provided message) when the environmental condition detector with validated personalized verbal messages 100 is being prepared for use in the set-up mode. In the set-up mode, the user verbalizes (speaks) a message into the audio input transducer 110 (for example, a microphone which transforms the verbalized message into an electrical signal) whereby the speech recognition and message matching circuitry 120 under control of the electronic control circuitry 130 electronically stores and analyzes the user verbalized message to determine if that message matches an electronic form of at least one manufacturer pre-programmed verbal message stored in electronic memory 140. If the user's verbalized message is found to match manufacturer pre-programmed message content stored in electronic memory 140 within a manufacturer predefined speech recognition error tolerance or error probability, the stored, user verbalized message is validated as comprising safe message content, and, thus is electronically identified to be audibly emitted in the user's voice from the audio output transducer 160 when an environmental condition is sensed by environmental condition sensor 150. Therefore, only safe, user-spoken message content validated to be safe by electronic comparison to manufacturer pre-programmed and approved message content can be output in the user's voice when an environmental condition is sensed. A safe message or safe message content includes a message or message content which has been approved by the manufacturer of the environmental condition detector to be an appropriate and safe message or message content to be audibly emitted when a particular environmental condition is sensed. Validation of the user-provided message results in electronically identifying the user-provided message in the electronic memory 140 by pointing to an electronic memory address of the user-provided message in one embodiment. In at least one embodiment, the manufacturer pre-programmed messages have been pre-analyzed by speech recognition electronic software and converted to reduced electronic forms well known in speech recognition for signal comparison. The reduced electronic forms of the manufacturer pre-programmed verbal message are stored in electronic memory 140 from the factory to facilitate message matching with user-provided verbal messages which require speech recognition analysis after the user speaks a verbal message or message segment during a set-up mode. Electronic memory 140 can be comprised of parallel or serial memory.

The electronic control circuitry 130 is comprised of electronic circuitry which controls the overall functions of the environmental condition detector with validated personalized verbal messages 100 including, but not limited to, determining when the environmental condition sensor 150 has detected an environmental condition, controlling the speech recognition and message matching circuitry 120, identifying the verbal message to be audibly emitted when the environmental condition sensor 150 senses an environmental condition, entering and retrieving verbal messages into and from the electronic memory 140, driving the audio output transducer 160, controlling operation of the audio input transducer 110 to receive verbal messages from the user, controlling the set-up mode to prompt the user and to record a user's verbal message, determining if a battery back-up of the power supply 170 has sufficient voltage to power the electronic circuits, etc. The electronic control circuitry 130 is comprised of an ASIC in at least one embodiment, programmable circuitry such as a programmable microprocessor in another embodiment and a combination of a programmable circuitry and one or more ASIC's in yet another embodiment. In one embodiment, the speech recognition and message matching circuitry 120 comprises, at least in part, speech recognition circuitry such as, but not limited specifically to, a Sensory Incorporated NLP-5x integrated circuit chip with parallel and serial electronic memory. The power supply 170 is a battery power supply in one embodiment of the invention and is an alternating current power supply with an optional battery back-up in another embodiment. In one embodiment, the audio output transducer 160 is comprised of a plurality of output transducers where one output transducer design may be more effective at emitting verbal messages and another output transducer may be more effective at emitting alarm tones. For example, a simple piezo-electric output transducer may be more effective at emitting alarm tones and a speaker maybe more effective at emitting voice messages. In at least one embodiment, the amplitude of the user's verbal message must meet or exceed a pre-defined minimum threshold to be accepted in addition to message matching validation to assure that dwelling occupants can hear the user's verbal message when it is emitted. If the pre-defined minimum threshold is not met, the user is either audibly or visually prompted to re-enter his or her message in a louder voice.

In order to conserve power in at least one embodiment of the invention once the set-up mode is completed, the speech recognition and message matching circuitry 120 and audio input transducer 110 are de-energized or placed in a low current draw mode (sleep mode) by the electronic control circuitry 130. The set-up mode can be entered by activation of the function control interface 180, connected to the electronic control circuitry 130, which is a user interface that comprises one or more manually operated electric contacts in one embodiment and/or a receiver of radiant energy, such as but not limited to infrared light, in another embodiment. One function of the function control interface 180 is to place the environmental condition detector with validated personalized verbal messages 100 into the set-up mode where user recorded verbalized messages may be entered following verbal and/or visual prompts. The electronic memory 140 also stores manufacturer pre-programmed verbal instructions to guide and prompt (manufacturer message prompts) the user through the set-up mode. In another embodiment, the environmental condition detector with validated personalized verbal messages 100 automatically enters the set-up mode upon power-up such as inserting batteries or connecting to AC power. In at least one embodiment, the user is verbally prompted to record a personalized message in sequential segments of the message in order to facilitate message entry and to facilitate speech recognition and message matching with pre-programmed, manufacturer messages stored in electronic memory 140. Typically, message segments are more accurately repeated by users when prompted and are more rapidly processed electronically than are entire messages.

The speech recognition and message matching circuitry 120 utilizes speech recognition technology well known in the art of speech and voice recognition. For example, in one embodiment of the invention, the speech recognition and message matching circuitry 120 employs firmware/software that analyzes speaker-independent verbal messages. This method of speech recognition needs no prior training for the speech recognition and message matching circuitry 120 to become accustomed to a particular person's speech patterns and characteristics, and this method typically performs well when there are limited numbers of words, phrases, or sentences to be recognized.

In another embodiment of the invention, a more robust speech recognition system is used whereby the user trains the speech recognition system by reciting a list of pre-scripted words, phrases, or sentences into the speech recognition and message matching circuitry 120 through the audio input transducer 110 where the specific user's speech patterns and characteristics are analyzed. The speech recognition system can then use the specific user's voice patterns and characteristics to help recognize and match user verbal messages that were entered during the set-up mode of the environmental condition detector with validated personalized verbal messages 100. Thus, the training mode of the speech recognition system in this embodiment would occur in addition to the set-up mode described previously. Training modes of speech recognition systems for speaker dependent speech recognition are well known in the art of speech recognition.

In one embodiment of the invention, a housing is used to enclose the audio input transducer 110, the speech recognition and message matching circuitry 120, electronic control circuitry 130, electronic memory 140, the environmental condition sensor 150, and the audio output transducer 160.

It is understood that in all embodiments of this invention that the environmental condition sensor 150, 250, or 350 may comprise a single sensor and sensor type or more than one sensor and more than one sensor type known in the art. Illustrative examples of the types of single or multiple sensors that environmental condition sensor 150, 250, or 350 comprises are, without limitation, a smoke sensor, a fire sensor, a carbon monoxide sensor, a gas sensor, a thermal sensor, a motion sensor, a vibration sensor, a glass break sensor, an intrusion sensor, a magnetic switch sensor, an optical sensor, an earthquake sensor, an image sensor, a water sensor, a wave sensor, a pressure sensor, a radiation sensor, or an acoustic sensor. As a further example, one embodiment of an environmental condition detector with validated personalized verbal messages 100 includes both a smoke sensor and a carbon monoxide sensor. When multiple sensor types are used, sensing of a particular environmental condition by the environmental condition sensor 150 prompts the electronic control circuitry 130 to audibly emit a particular corresponding verbal message through the audio output transducer 160.

In one embodiment of the invention, the environmental condition detector with validated personalized verbal messages 100 is a single station unit that operates without connection to any other unit however, it may be connected to alternating current for power, if needed. In one embodiment, all of the components of the environmental condition detector with validated personalized verbal messages 100 are located within or in close proximity to a housing. The housing permits access known in the art for each sensor type so that the environmental condition can be sensed by the type of environmental condition sensor 150. For example, for a smoke detector or hazardous gas detector, the housing includes slots or holes for smoke or gas to enter the housing and contact the sensor(s).

In another embodiment of the invention, the environmental condition detector with validated personalized verbal messages 100 is a multiple station system comprising at least two interconnected detector stations. A station is a fully functional environmental condition detector with validated personalized verbal messages 100. The interconnection between stations is through well known wireless communication (such as radio frequency) or hardwired interconnection. In one embodiment, all of the components of the environmental condition detector with validated personalized verbal messages 100 are located within or in close proximity to the respective housings of each station unit with exception of an alternating or direct current power supply and any interconnecting wires comprising hardwire interconnection if said wires are different than those of the alternating or direct current power supply. Each housing permits access known in the art for each sensor type so that the environmental condition can be sensed by the type of environmental condition sensor 150. The multiple station system can operate without need of a central control panel since each station can function independently and can communicate the presence of an environmental condition with the other interconnected stations through wireless or hardwired interconnections.

In one embodiment, the function control interface 180 is configured as a contact switch which, when activated, will test the functionality of the environmental condition detector with validated personalized verbal messages 100 including audibly emitting any verbal message that would be emitted in response to the sensing of an environmental condition sensed by the environmental condition sensor 150. Prolonged actuation of the function control interface 180 or repeated activation can also cause the environmental condition detector with validated personalized verbal messages 100 to enter the set-up mode.

In another embodiment of the invention, if the user chooses not to record a verbal message in his or her own voice, the user may select at least one of a manufacturer pre-programmed verbal message, to be audibly emitted when an environmental condition is sensed, by setting an electronic switch or selecting one or more electrical jumper positions connected to the electronic control circuitry 130.

In yet another embodiment, after a pre-defined number of user attempts to re-enter a verbal message resulting in a message rejection (non-validation) by the speech recognition and message matching circuitry 120, the user is no longer prompted to re-enter a verbal message and a default safety message will be played in the pre-programmed manufacturer voice through the audio output transducer 160 when the environmental condition sensor senses an environmental condition.

In one embodiment of the invention, the user selects the message he/she desires from a written script (written menu) provided by the manufacturer. In another embodiment, the electronic control circuitry 130 audibly emits the possible acceptable messages to record (audible menu) as an audible verbal prompt for the user through an audio output transducer 160 in a manufacturer, pre-programmed voice. The acceptable manufacturer pre-programmed messages may be audibly emitted in total or in sequential message segments so the user can more accurately speak the message as segments of the message. As a non-limiting example, the audible verbal prompt to the user may be a first message segment, "Now say 'Caution, fire in the house!'" and then the user speaks the first message segment "Caution, fire in the house!" in his/her voice into the audio input transducer 110. Then the audible verbal prompt to the user may be a second message segment, as a non-limiting example, "Now say 'Follow our escape plan now!'" whereby the user speaks the second message segment "Follow our escape plan now!" in his/her voice into the audio input transducer 110. The end result of this non-limiting illustrative example would be the playing of following message in the user's voice when an environmental condition is detected, "Caution, fire in the house! Follow our escape plan now!" In this embodiment, the speech recognition and message matching circuitry 120 attempts to recognize and validate each message segment the user speaks by electronically matching each message segment with a segment of a manufacturer pre-programmed message stored in electronic memory 140. If the first message segment is not recognized and validated, then the user is prompted to re-speak the first message segment. A message segment is recognized and validated before the user is prompted to enter any subsequent message segments in this embodiment. In other words, the audible verbal prompt is a manufacturer pre-recorded, verbal instructional message delivered in at least two audible, sequential message segments whereby the user repeats (speaks) sequential message segments into the microphone as prompted for each message segment by the audible verbal prompt.

Figure 2:
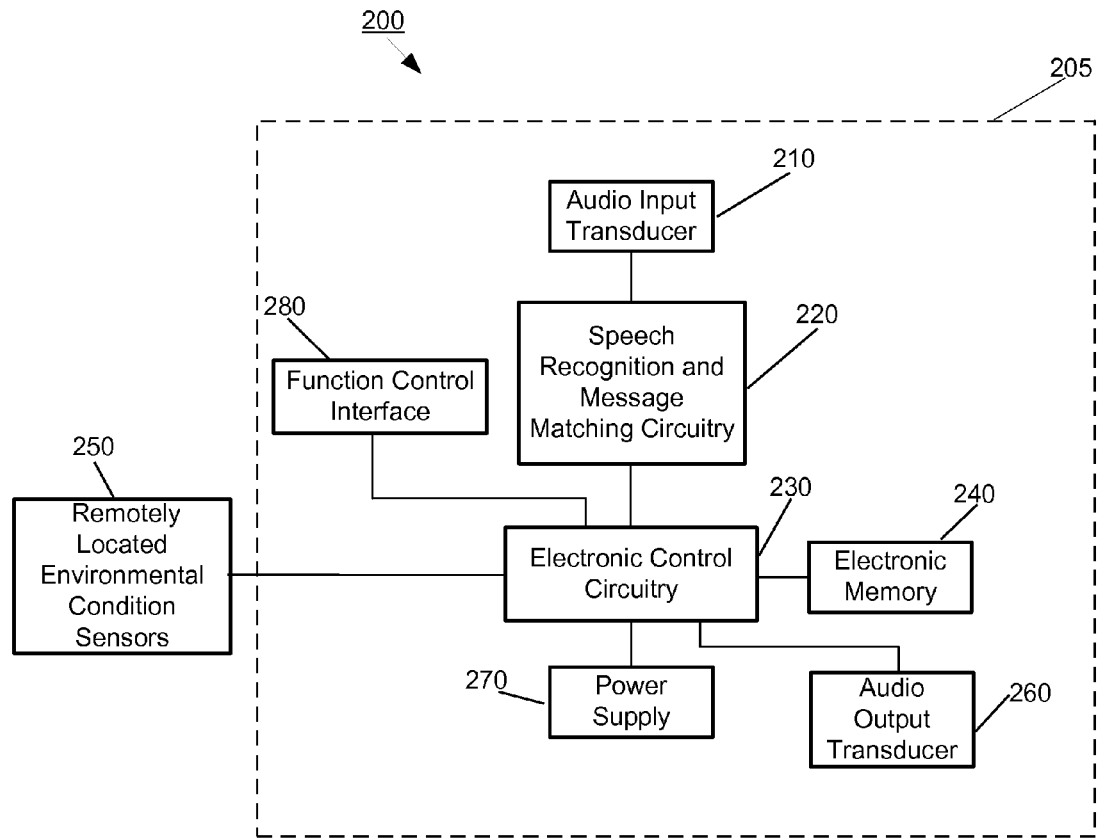
FIG. 2 is a schematic diagram of the components of the environmental condition detector with validated personalized verbal messages in a centrally controlled system.

In another embodiment of the invention (FIG. 2), the environmental condition detector with validated personalized verbal messages 200 is configured as a centrally controlled security system for a dwelling or building whereby the environmental condition sensor 250 is remotely positioned with respect to a central location (central control panel 205) where the speech recognition and message matching circuitry 220, electronic control circuitry 230, and electronic memory 240 reside. In this embodiment, the audio output transducer 260 may be located at the position of the environmental condition sensor 250 or at a remote location or at the central control panel 205 as shown. Multiple environmental condition sensors 250 may be hardwired or wirelessly connected to the electronic control circuitry 230, and all environmental condition sensors 250 need not sense the same type of environmental condition. In a wirelessly connected sensor version of the centrally controlled security system embodiment, the electronic control circuitry 230 also includes a wireless receiver and the environmental condition sensors 250 also include a wireless transmitter such as a radio frequency transmitter to communicate with the radio frequency receiver.

Figure 3:
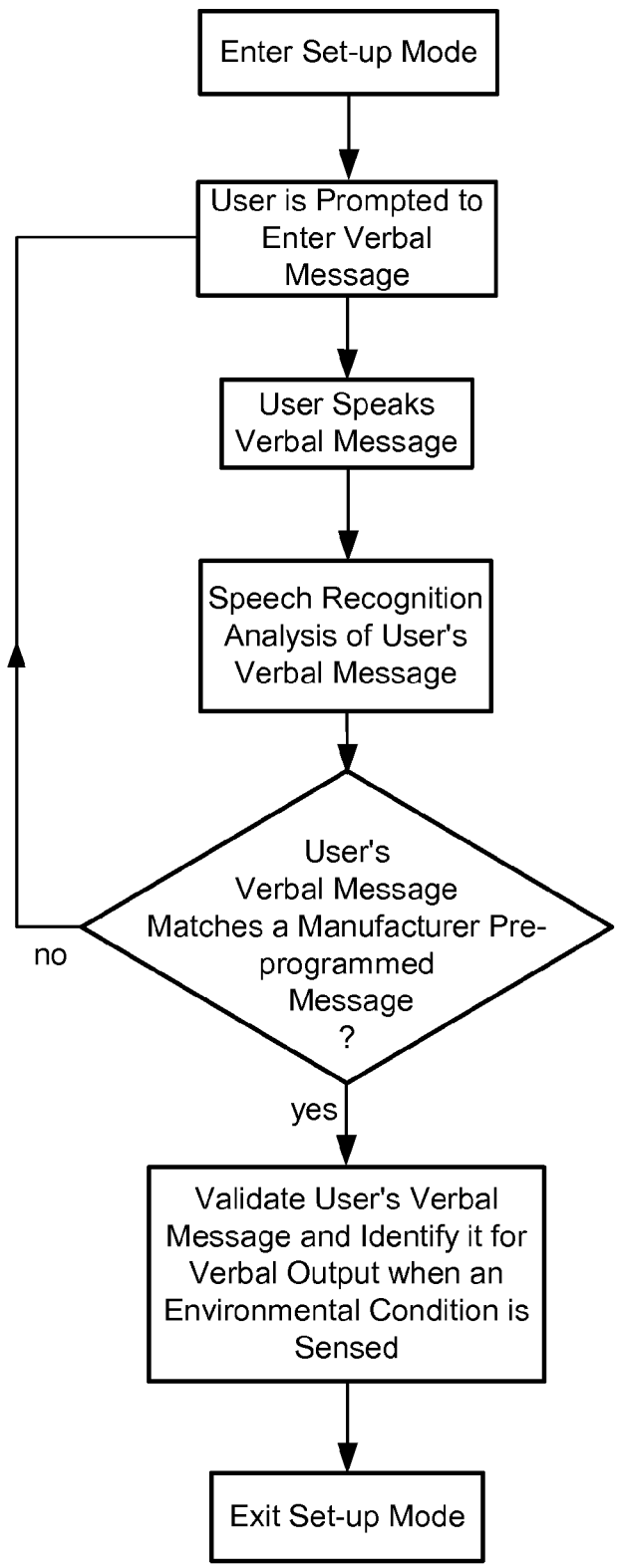
FIG. 3 is a flow diagram illustrating how a user's verbal message is matched to a manufacturer pre-programmed verbal message and validated before being identified to be audibly emitted when an environmental condition is sensed.

The flow diagram in FIG. 3 illustrates one embodiment of the basic operational logic of the set-up mode of the environmental condition detector with validated personalized verbal messages 100. Once the set-up mode is entered, the user is visually, audibly, or otherwise prompted to record a verbal message in his or her own voice from a menu of possible manufacturer pre-programmed messages. The user then speaks a selected message into the audio input transducer 110 and the user's spoken message is recorded into electronic memory 140. The user's recorded message may contain a single word, a phrase(s), or a sentence(s). The speech recognition and message matching circuitry 120 under control of the electronic control circuitry 130 attempts to electronically match the message phoneme(s), word(s), phrase(s), or sentence(s) to those of at least one manufacturer pre-programmed message stored in the electronic memory 140 within a pre-defined speech recognition error tolerance well known in the art. If the speech recognition and message matching circuitry 120 under control of the electronic control circuitry 130 determines that the user's recorded verbal message matches an electronic form of a manufacturer pre-programmed verbal message (a safe message) within the pre-defined speech recognition error tolerance or error probability, then the user's recorded verbal message is considered safe, is validated, and the message is electronically identified to be audibly emitted in the user's voice when an environmental condition is sensed by the environmental condition sensor 150. If the speech recognition and message matching circuitry 120 under control of the electronic control circuitry 130 determines that the user's recorded verbal message does not match a manufacturer pre-programmed verbal message within the predefined speech recognition error tolerance or error probability, the user's verbal message is rejected and the user is visually, audibly, or otherwise prompted to re-record a verbal message to attempt to match a manufacturer pre-programmed verbal message pre-programmed in the electronic memory 140. Once a user's recorded verbal message is validated as a match to a manufacturer pre-programmed verbal message, the user's recorded verbal message is electronically identified in the electronic memory 140 to be audibly emitted in the user's voice when an environmental condition is sensed by the environmental condition sensor 150, the set-up mode is exited.

Figure 4:
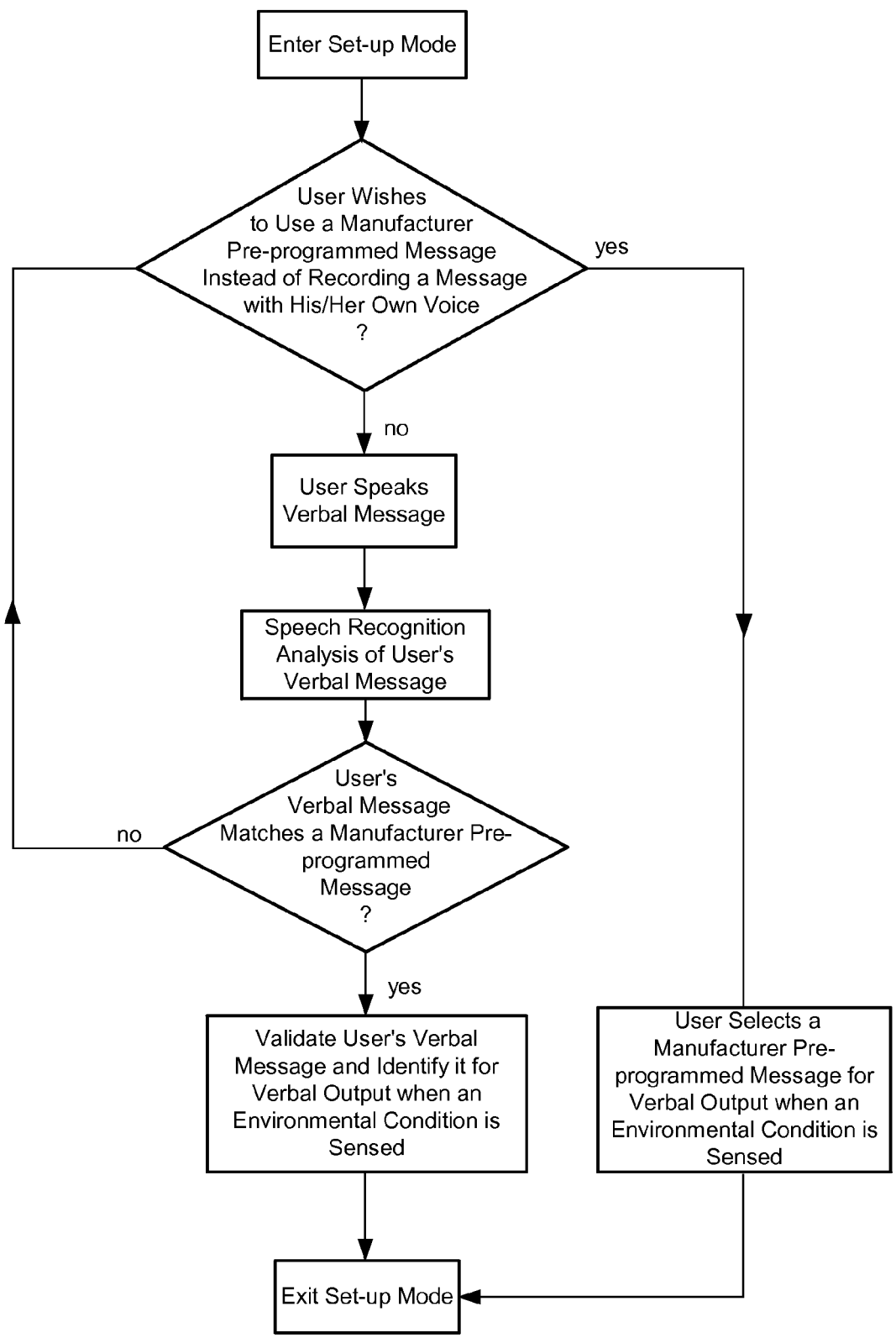
FIG. 4 is a flow diagram illustrating how a user may option to use a manufacturer pre-programmed message to be audibly emitted when an environmental condition is sensed if the user does not wish to record a message in his or her own voice. This may be useful if the user's message recorded in their own voice, for any reason, cannot match any manufacturer pre-programmed verbal message.

The flow diagram in FIG. 4 illustrates one embodiment of the operational logic of the set-up mode of the environmental condition detector with validated personalized verbal messages 100 whereby a user can option out of recording a message in his or her voice and instead default to a selected, manufacturer pre-programmed verbal message. Once the set-up mode is entered, the user is visually, audibly, or otherwise prompted decide if he or she wishes to record a verbal message in his or her own voice matching at least one message from a menu of possible manufacturer pre-programmed messages. If the user does not wish to record a message in his or her own voice, then the user activates the functional control interface 180 or verbally responds to advance to an audibly played menu of manufacturer pre-preprogrammed verbal messages from which the user can, by activating the functional control interface 180, select a message to be audibly emitted in the manufacturer pre-programmed voice when an environmental condition is sensed by the environmental condition sensor 150. The set-up mode is then exited. However, if the user does wish to record a message in his or her own voice, then the user then speaks a selected message into the audio input transducer 110, and the user's spoken message is recorded into electronic memory 140. The user's recorded message may contain a single word, phrase(s), or sentence(s). The speech recognition and message matching circuitry 120 under control of the electronic control circuitry 130 attempts to match the message phoneme(s) word(s), phrase(s), or sentence(s) to at least one manufacturer pre-programmed message stored in the electronic memory 140. If the speech recognition and message matching circuitry 120 under control of the electronic control circuitry 130 determines that the user's recorded verbal message matches a manufacturer pre-programmed verbal message, then the user's recorded verbal message is validated and the message is electronically identified to be audibly emitted in the user's voice when an environmental condition is sensed by the environmental condition sensor 150. If the speech recognition and message matching circuitry 120 under control of the electronic control circuitry 130 determines that the user's recorded verbal message does not match a manufacturer pre-programmed verbal message, the user's verbal message is rejected and the user is visually, audibly, or otherwise prompted to re-record a verbal message to attempt to match a manufacturer pre-programmed verbal message stored in the electronic memory 140 or to, instead, select a manufacturer pre-programmed verbal message stored in the electronic memory 140 to be audibly emitted when an environmental condition is sensed, if the user no longer wishes to record a verbal message in his or her own voice. Once a user's recorded verbal message is validated as a match to a manufacturer pre-programmed verbal message, the user's recorded message is electronically identified to be audibly emitted in the user's voice when an environmental condition is sensed by the environmental condition sensor 150, the set-up mode is exited.

Figure 5:
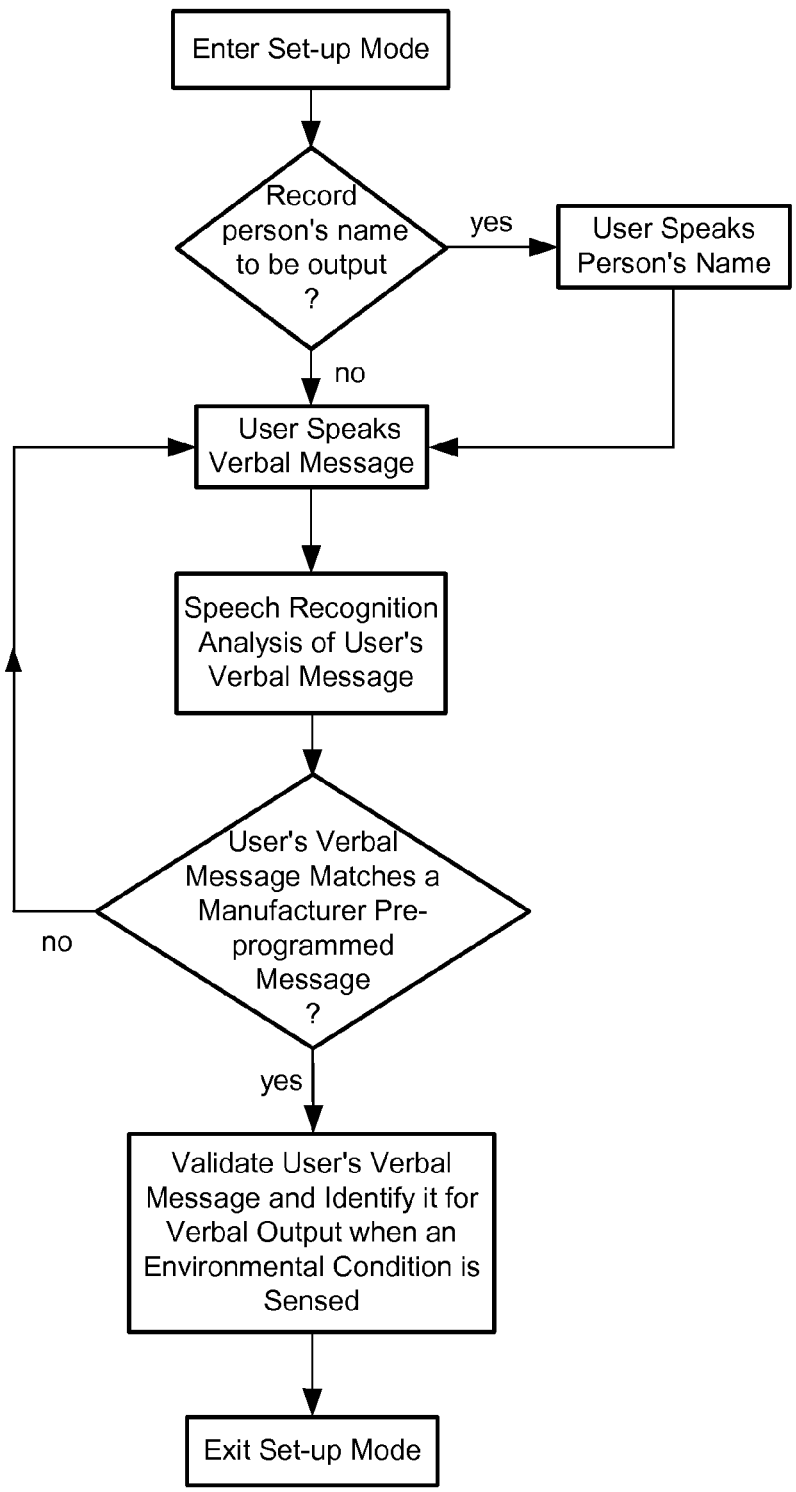
FIG. 5 is a flow diagram illustrating how a user may option to record a person's name in his or her own voice as a portion of the verbal message to be audibly emitted when an environmental condition is sensed.

The flow diagram in FIG. 5 illustrates one embodiment of the operational logic of the set-up mode of the environmental condition detector with validated personalized verbal messages 100 whereby a user can option to record a person's name in his or her own voice that will be audibly emitted along with any other verbal messages when an environmental condition is sensed. Once the set-up mode is entered, the user is visually, audibly, or otherwise prompted to decide if he or she wishes to record a person's name in their own voice. If the user wishes to record a person's name, the person speaks the name into the audio input transducer 110 when prompted. If the user does not wish to record a person's name in his or her own voice, then the user activates the functional control interface 180 to visually, audibly, or otherwise further prompt the user to speak a selected message into the audio input transducer 110, and the user's spoken message is recorded into electronic memory 140. The user's recorded message may contain a single word, a phrase(s) or a sentence(s). The speech recognition and message matching circuitry 120 under control of the electronic control circuitry 130 attempts to electronically match the message phoneme(s), word(s), phrase(s), or sentence(s) to at least one manufacturer pre-programmed message stored in the electronic memory 140. If the speech recognition and message matching circuitry 120 under control of the electronic control circuitry 130 determines that the user's recorded verbal message matches a manufacturer pre-programmed verbal message, then the user's recorded verbal message is validated and the message is electronically identified to be audibly emitted in the user's voice when an environmental condition is sensed by the environmental condition sensor 150. If the speech recognition and message matching circuitry 120 under control of the electronic control circuitry 130 determines that the user's recorded verbal message does not match a manufacturer pre-programmed verbal message, the user's verbal message is rejected and the user is visually, audibly, or otherwise prompted to re-record a verbal message to attempt to match a manufacturer pre-programmed verbal message stored in the electronic memory 140. Once a user's recorded verbal message is validated as a match to a manufacturer pre-programmed verbal message, the user's recorded verbal message is electronically identified to be audibly emitted in the user's voice when an environmental condition is sensed by the environmental condition sensor 150, the set-up mode is exited.

Figure 6:
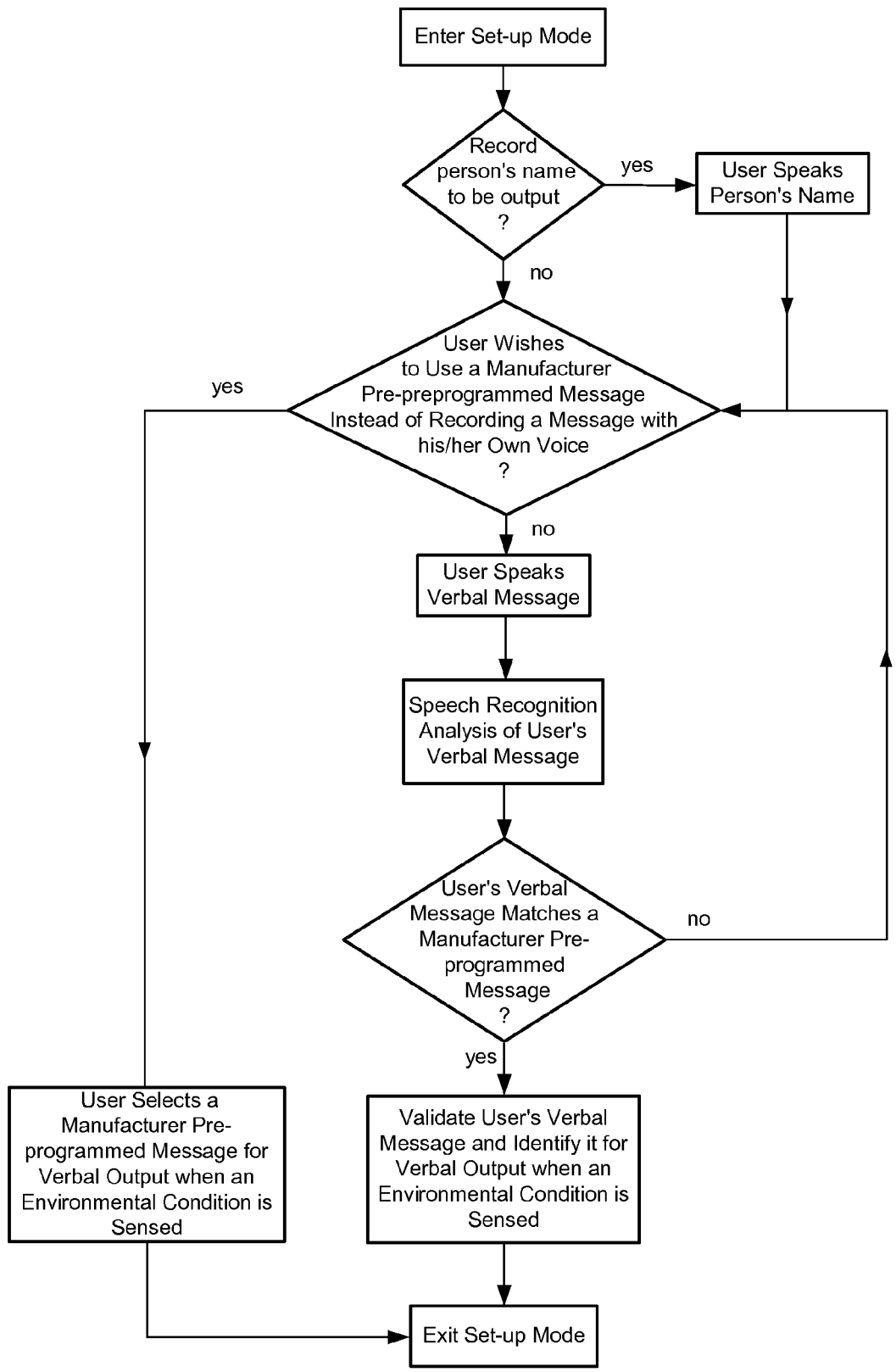
FIG. 6 is a flow diagram illustrating how a user may option to record a person's name in his or her own voice as a portion of the verbal message to be audibly emitted when an environmental condition is sensed and also illustrating how a user may option to use a manufacturer pre-programmed message to be audibly emitted when an environmental condition is sensed if the user does not wish to record a message in their own voice.

The flow diagram in FIG. 6 illustrates one embodiment of the operational logic of the set-up mode of the environmental condition detector with validated personalized verbal messages 100 whereby a user may option to record a person's name in their own voice as a portion of the verbal message to be audibly emitted when an environmental condition is sensed and also whereby a user may option to use a manufacturer recorded verbal message to be audibly emitted when an environmental condition is sensed if the user does not wish to record a message in their own voice. Once the set-up mode is entered, the user is visually, audibly, or otherwise prompted decide if he or she wishes to record a person's name in their own voice. If the user wishes to record a person's name, the person speaks the name into the audio input transducer 110 when prompted. If the user's does not wish to record a person's name in his or her own voice, then the user activates the functional control interface 180 to visually, audibly, or otherwise further prompt the user if he or she wants to record a message in his or her own voice. If the user's does not wish to record a message in his or her own voice, then the user activates the functional control interface 180 or verbally responds to advance to an audibly played menu of manufacturer pre-programmed messages from which the user can, by activating the functional control interface 180, select a message to be audibly emitted in the manufacturer pre-programmed voice when an environmental condition is sensed by the environmental condition sensor 150. The set-up mode is then exited. However, if the user does wish to record a message in his or her own voice, then the user is visually, audibly, or otherwise prompted to speak his or her selected message into the audio input transducer 110 and the user's spoken message is recorded into electronic memory 140. The user's recorded message may contain a single word, a phrase(s), or sentence(s). The speech recognition and message matching circuitry 120 under control of the electronic control circuitry 130 attempts to electronically match the message phoneme(s), word(s), phrase(s), or sentence(s) to at least one manufacturer pre-programmed message stored in the electronic memory 140. If the speech recognition and message matching circuitry 120 under control of the electronic control circuitry 130 determines that the user's recorded verbal message matches a manufacturer pre-programmed verbal message, then the user's recorded verbal message is validated and the message is electronically identified to be audibly emitted in the user's voice when an environmental condition is sensed by the environmental condition sensor 150. If the speech recognition and message matching circuitry 120 under control of the electronic control circuitry 130 determines that the user's recorded verbal message does not match a manufacturer pre-programmed verbal message, the user's verbal message is rejected and the user is visually, audibly, or otherwise prompted to re-record a verbal message to attempt to match a manufacturer pre-programmed verbal message stored in the electronic memory 140. Once a user's recorded verbal message is validated as a match to a manufacturer pre-programmed verbal message, the user's recorded verbal message is electronically identified to be audibly emitted in the user's voice when an environmental condition is sensed by the environmental condition sensor 150, the set-up mode is exited.

Figure 7:
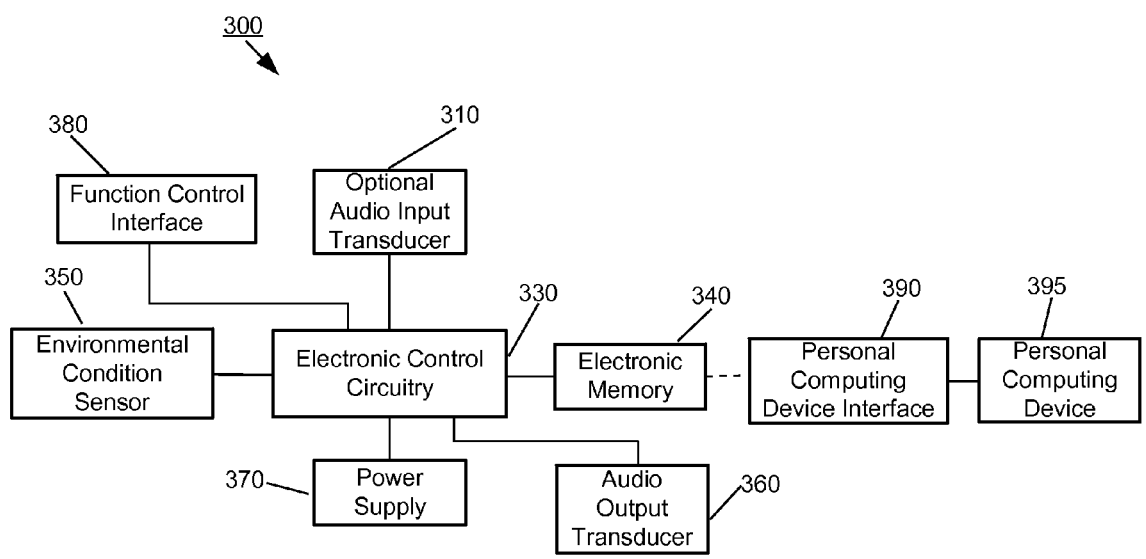
FIG. 7 is a schematic diagram of the components of the environmental condition detector with validated personalized verbal messages using a personal computing device to facilitate the set-up mode and to simplify the detector components needed after the set-up mode is complete.

In another embodiment of the invention (FIG. 7), during a period when an environmental condition sensor 350 senses an environmental condition, the electronic control circuitry 330 emits an audible alarm via the audio output transducer 360 to notify persons in the vicinity of the environmental condition detector that a potentially hazardous condition is being sensed. In one embodiment, the audible alarm comprises a personalized verbal message selected by the user in the user's voice. The audible alarm may also comprise a tonal pattern. During the set-up mode, the environmental condition detector with validated personalized verbal messages 300 is interfaced to a personal computing device 395 such as, but not limited to, a laptop computer, desktop computer, PDA, smart cell phone, and a task-specific computing device for the specific purpose of setting-up an environmental condition detector with validated personalized verbal messages 300. The personal computing device 395 is used, among other things, to update firmware/software and manufacturer pre-programmed messages in the electronic memory 340. In one embodiment, the manufacturer pre-programmed messages are stored on a removable computer readable media provided by the manufacturer of the environmental condition detector with validated personalized verbal messages 300 or can be downloaded from the internet to a personal computing device 395. During the set-up mode of the environmental condition detector with validated personalized verbal messages 300, the personal computing device 395 is interfaced via a personal computing device interface 390 to the electronic control circuitry 330 of the environmental condition detector with validated personalized verbal messages 300. In one embodiment, the speech recognition and message matching software resides in the personal computing device 395 to make use of CPU power of the personal computing device 395 and to simplify the electronics and processing requirements of the environmental condition detector with validated personalized verbal messages 300 with regards to speech recognition which is typically needed only during the set-up mode. The optional audio input device 310 can either be included in the environmental condition detector with validated personalized verbal messages 300 or a microphone connected to or built into the personal computing device 395 can be used instead to receive the user's verbal message. Once the speech recognition and message matching software determines that a user's recorded verbal message matches one of the manufacturer pre-programmed message stored in the memory of the personal computing device 395 or on the computer readable media provided by the manufacturer, the user's recorded verbal message is validated and entered into the electronic memory 340 of the environmental condition detector with validated personalized verbal messages 300 so that the validated user's recorded verbal message is audibly emitted when an environmental condition detector is sensed. Once the set-up mode of the environmental condition detector with validated personalized verbal messages 300 is completed, the personal computing device 395 may be disconnected from the environmental condition detector with validated personalized verbal messages 300. The personal computing device interface 390 between the electronic control circuitry 330 and a personal computing device 395 comprises, without limitation, one of a hardwired interface, a universal serial bus (USB) interface, a wireless interface (WiFi, Bluetooth®, etc), an optical interface, etc. The operational logic of the set-up mode of the environmental condition detector with validated personalized verbal messages 300 also follows the set-up mode flow diagrams of FIG. 3, FIG. 4, FIG. 5, and FIG. 6 with the personal computing device 395 handling the speech recognition and message matching and providing the prompting of the user to make decisions whether to record a person's name or to use a manufacturer pre-programmed message instead of recording his or her own message in his or her own voice. In one embodiment of the environmental condition detector with validated personalized verbal messages 300, the personal computing device 395 displays a graphical user interface on the video output screen of the personal computing device 395 to guide the user through the set-up mode of the environmental condition detector with validated personalized verbal messages 300.

In at least one embodiment of the invention, the message matching policy used is based on an ordered phoneme by phoneme, word by word, or phrase by phrase match of the manufacturer pre-programmed verbal messages with an ordered phoneme by phoneme, word by word or phrase by phrase match of the user's verbal message after the user's verbal message has been analyzed and reduced to an electrical signal or mathematical form by the speech recognition and message matching circuitry 120. In one embodiment, if at least one word between the user's verbal message and the manufacturer pre-programmed verbal message does not match in an ordered word by word or phrase by phrase comparison, then the speech recognition and message matching circuitry 120 under control of the electronic control circuitry 130 determines that a message match has not occurred. In other words, in at least one embodiment, both the words and the order of the words of the message must match as determined by the speech recognition and message matching circuitry 120 for message validation to occur. It is understood that matching of phonemes, words, phrases, or messages can mean matching of electronic signals or mathematical forms or speech templates corresponding to words or messages after words or messages have been analyzed by the speech recognition and message matching circuitry 120 under control of the electronic control circuitry 130. It is also understood in the art of speech recognition that matching of electrical signals or mathematical forms, coded patterns, or speech templates involves a degree of at least one error tolerance range of acceptance as a design choice specified and pre-defined by the manufacturer to define a message match by comparing at least one parameter characteristic of respective electrical signals or respective mathematical forms. Message matching means the respective electronic or mathematical forms of the phonemes, words or phrases of the user's message match, within a pre-defined speech recognition error tolerance or error probability, the manufacturer pre-recorded message(s) when reduced to electrical signals, mathematical forms, speech templates or other speech recognition parameters or forms known in the art.

Speech recognition includes, but is not limited to, the analysis of audible verbal messages often involving a conversion of an acoustic signal to an analog or a digital signal that can be further electronically processed by known methods and algorithms in speech recognition arts such as, but not limited to, fast Fourier transforms (FFT), filtering, amplification, attenuation, linear predictive coding (LPC), dynamic time warping (DTW), pattern recognition, coding patterns, neural networks analysis, hidden Markov modeling (HMM), vocal track normalization, maximum likelihood linear regression, maximum likelihood linear transformation, speech frame comparison, speech template comparison, natural language processing, probabilistic prediction, feature numbers, and other algorithms known to the art of speech recognition.

It is understood that the term "circuitry" used herein is meant to include both hardware circuit components along with any firmware/software executing within hardware circuit components.

It is understood that the manufacturer pre-programmed message stored in electronic memory 140 can be stored in various forms including but not limited to a digital form, a mathematical form, a coded pattern form, a speech template form, a speech frame form, a digitally compressed form, a reduced analyzed form, a pre-processed form, etc.

The various embodiments described above are merely descriptive and are in no way intended to limit the scope of the invention. Modification will become obvious to those skilled in the art in light of the detailed description above, and such modifications are intended to fall within the scope of the appended claims. It is to be understood that no limitation with respect to the specific apparatus illustrated herein is intended or should be inferred.

I claim:

1. An environmental condition detector comprising:
   electronic control circuitry;
   speech recognition and message matching circuitry connected to the electronic control circuitry;
   an environmental condition sensor connected to the electronic control circuitry;
   an audio output transducer connected to the electronic control circuitry;
   electronic memory connected to the electronic control circuitry;
   at least one manufacturer pre-programmed message stored in the electronic memory;
   the speech recognition and message matching circuitry analyzes a user-provided verbal message and rejects the user-provided verbal message when the user-provided verbal message fails to match the at least one manufacturer pre-recorded message stored in the electronic memory;

the speech recognition and message matching circuitry validates a user-provided verbal message when the user-provided verbal message matches a manufacturer pre-recorded message stored in the electronic memory; and
the validated, user-provided verbal message is emitted in the voice of the user through the audio output transducer when the environmental condition sensor senses an environmental condition.

2. The environmental condition detector in claim 1 wherein the user-provided verbal message is spoken into a microphone, connected to the speech recognition and message matching circuitry, by a user after a verbal prompt is emitted from the audio output transducer.

3. The environmental condition detector in claim 2 wherein the verbal prompt is a manufacturer pre-recorded message delivered in at least two different audible, sequential message segments whereby the sequential message segments are verbally repeated into the microphone by the user as prompted.

4. The environmental condition detector in claim 2 wherein after a pre-set number of rejections of a user-provided message by the speech recognition circuitry and message matching circuitry, the user is no longer prompted to repeat a verbal message.

5. The environmental condition detector in claim 2 wherein the microphone receives a verbal message from the user in a set-up mode of operation.

6. The environmental condition detector in claim 1 wherein the environmental condition sensor is positioned in a remote location with respect to a central control panel.

7. The environmental condition detector of claim 1 wherein, during a set-up mode, a person's name is recorded into electronic memory to be emitted in the voice of the user through the audio output transducer when an environmental condition is sensed.

8. The environmental condition detector in claim 1 wherein the environmental condition sensor comprises any one of a smoke sensor, a fire sensor, a carbon monoxide sensor, a gas sensor, a thermal sensor, a motion sensor, a vibration sensor, a glass break sensor, an intrusion sensor, a magnetic switch sensor, an optical sensor, an earthquake sensor, an image sensor, a water sensor, a wave sensor, a pressure sensor, a radiation sensor, or an acoustic sensor.

9. The environmental condition detector of claim 1 wherein the environmental condition sensor comprises both a smoke sensor and a carbon monoxide sensor.

10. The environmental condition detector of claim 1 wherein the electronic control circuitry, the speech recognition and message matching circuitry, the electronic memory, the audio output transducer, and the environmental condition sensor are contained within a housing.

11. An environmental condition detector comprising:
electronic control circuitry;
an environmental condition sensor coupled to the electronic control circuitry;
an audio input transducer coupled to the electronic control circuitry;
an audio output transducer coupled to the electronic control circuitry;
speech recognition and message matching circuitry coupled to the electronic control circuitry;
electronic memory coupled to the electronic control circuitry;
at least one manufacturer pre-programmed message stored in the electronic memory;
the audio input transducer receives an audible verbal message spoken by a user during a set-up mode whereby the speech recognition and message matching circuitry analyzes the verbal message and rejects the verbal message when the verbal message fails to match the at least one manufacturer pre-recorded message stored in the electronic memory;
the speech recognition and message matching circuitry validates the verbal message as comprising safe content when the verbal message matches a manufacturer pre-recorded message stored in the electronic memory; and
the validated, verbal message is emitted, in the voice of the user, through the audio output transducer.

12. The environmental condition detector of claim 11 wherein, during the set-up mode, a user records a person's name to be emitted in the user's voice through the audio output transducer when an environmental condition is sensed.

13. The environmental condition detector in claim 11 wherein the environmental condition sensor comprises any one of a smoke sensor, a fire sensor, a carbon monoxide sensor, a gas sensor, a thermal sensor, a motion sensor, a vibration sensor, a glass break sensor, an intrusion sensor, a magnetic switch sensor, an optical sensor, an earthquake sensor, an image sensor, a water sensor, a wave sensor, a pressure sensor, a radiation sensor, or an acoustic sensor.

14. An environmental condition detector comprising:
electronic circuitry;
an environmental condition sensor connected to the electronic circuitry;
an audio output transducer connected to the electronic circuitry;
the electronic circuitry further comprises speech recognition circuitry;
the speech recognition circuitry analyzes a user-recorded verbal message and rejects the user-recorded verbal message when the user-recorded verbal message fails to match a manufacturer pre-recorded message stored in the electronic memory;
a user-recorded verbal message is analyzed by the speech recognition circuitry and is validated when the user-recorded verbal message matches a manufacturer pre-recorded message stored in the electronic memory; and
the validated, user-recorded, verbal message is audibly emitted in the voice of a user through the audio output transducer when the environmental condition sensor senses an environmental condition.

15. The environmental condition detector in claim 14 wherein the environmental condition sensor comprises any one of a smoke sensor, a fire sensor, a carbon monoxide sensor, a gas sensor, a thermal sensor, a motion sensor, a vibration sensor, a glass break sensor, an intrusion sensor, a magnetic switch sensor, an optical sensor, an earthquake sensor, an image sensor, a water sensor, a wave sensor, a pressure sensor, a radiation sensor, or an acoustic sensor.

16. The environmental condition detector in claim 14 wherein the user is notified by a verbal prompt to record a verbal message.

17. The environmental condition detector in claim 16 wherein the verbal prompt is a manufacturer pre-recorded message delivered in at least two different audible, sequential message segments whereby the sequential message segments are verbally repeated into the microphone by the user as prompted.

18. An environmental condition detector comprising:
electronic control circuitry;
an environmental condition sensor connected to the electronic control circuitry;
speech recognition and message matching circuitry connected to the electronic control circuitry;

a microphone connected to the speech recognition and message matching circuitry;

electronic memory connected to the electronic control circuitry;

an audio output transducer connected to the electronic control circuitry;

at least one manufacturer pre-recorded message stored in the electronic memory;

the microphone receives a verbal message spoken by a user;

the speech recognition and message matching circuitry analyzes the user's verbal message and rejects the user's verbal message when the user's verbal message fails to match a manufacturer pre-recorded message stored in the electronic memory;

the speech recognition and message matching circuitry validates the user's verbal message as comprising safe content when the user's verbal message matches a manufacturer pre-recorded message stored in the electronic memory; and the validated user's verbal message is emitted, in the voice of the user, through the audio output transducer when the environmental condition sensor senses an environmental condition.

19. The environmental condition detector in claim 18 wherein a user is prompted to repeat a verbal message after a previous verbal message was rejected by the speech recognition and message matching circuitry.

20. The environmental condition detector in claim 19 wherein after a pre-set number of rejections of a verbal message by the speech recognition circuitry and message matching circuitry, the user is no longer prompted to repeat a verbal message.

21. The environmental condition detector of claim 20 wherein the electronic control circuitry audibly emits a default manufacturer pre-recorded message through the audio output transducer when the environmental condition sensor senses an environmental condition.

22. The environmental condition detector in claim 18 wherein a user speaks the verbal message into the microphone after a verbal prompt is emitted from the audio output transducer.

23. The environmental condition detector in claim 22 wherein the verbal prompt is a manufacturer pre-recorded prompt message delivered in at least two different audible, sequential message segments whereby the sequential message segments are verbally repeated into the microphone by the user as prompted for each message segment.

24. The environmental condition detector in claim 18 wherein the environmental condition sensor comprises any one of a smoke sensor, a fire sensor, a carbon monoxide sensor, a gas sensor, a thermal sensor, a motion sensor, a vibration sensor, a glass break sensor, an intrusion sensor, a magnetic switch sensor, an optical sensor, an earthquake sensor, an image sensor, a water sensor, a wave sensor, a pressure sensor, a radiation sensor, or an acoustic sensor.

* * * * *